(12) United States Patent
Rozman et al.

(10) Patent No.: US 9,318,253 B2
(45) Date of Patent: Apr. 19, 2016

(54) HYBRID PLANAR COMMON-MODE CHOKE

(71) Applicant: Hamilton Sundstrand Corporation, Charlotte, NC (US)

(72) Inventors: Gregory I. Rozman, Rockford, IL (US); Jacek F. Gieras, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 66 days.

(21) Appl. No.: 14/268,346

(22) Filed: May 2, 2014

(65) Prior Publication Data

US 2015/0318103 A1    Nov. 5, 2015

(51) Int. Cl.

| | |
|---|---|
| *H01F 17/04* | (2006.01) |
| *H01F 27/24* | (2006.01) |
| *H01F 27/42* | (2006.01) |
| *H01F 30/12* | (2006.01) |
| *H02M 1/12* | (2006.01) |
| *H02M 7/217* | (2006.01) |
| *H01F 3/10* | (2006.01) |
| *H01F 17/06* | (2006.01) |
| *H01F 37/00* | (2006.01) |
| *H01F 27/06* | (2006.01) |

(52) U.S. Cl.
CPC ............... *H01F 27/24* (2013.01); *H01F 3/10* (2013.01); *H01F 17/062* (2013.01); *H01F 27/42* (2013.01); *H01F 30/12* (2013.01); *H01F 37/00* (2013.01); *H02M 1/126* (2013.01); *H02M 7/2173* (2013.01); *H01F 2003/106* (2013.01); *H01F 2027/065* (2013.01)

(58) Field of Classification Search
CPC . H02M 2001/123; H02M 1/44; H02M 7/219; H01F 2017/093; H01F 27/24
See application file for complete search history.

(56) References Cited

U.S. PATENT DOCUMENTS

| | | | | |
|---|---|---|---|---|
| 3,823,362 | A | * | 7/1974 | Bailey ................... H02M 7/162 219/779 |
| 3,833,872 | A | * | 9/1974 | Marcus ................. H01F 27/255 336/183 |
| 6,377,479 | B1 | | 4/2002 | Ayano et al. |
| 6,980,077 | B1 | * | 12/2005 | Chandrasekaran ... H01F 27/255 336/212 |

(Continued)

FOREIGN PATENT DOCUMENTS

| | | |
|---|---|---|
| DE | 102008031296 A1 | 8/2009 |
| EP | 1085536 A1 | 3/2001 |

(Continued)

OTHER PUBLICATIONS

Ning Zhu et al., "An Integrated AC Choke Design for Common-Mode Current Suppression in Neutral-Connected Power Converter Systems", IEEE Trans. On Power Electronics, vol. 27, No. 3, pp. 1228-1236, 2012.

(Continued)

*Primary Examiner* — Harry Behm
*Assistant Examiner* — Peter Novak
(74) *Attorney, Agent, or Firm* — Kinney & Lange, P.A.

(57) ABSTRACT

A common-mode choke includes a plurality of hybrid core inductors and a printed circuit board. Each of the plurality of hybrid core inductors includes a first core made of a first material, a second core made of a second material, and at least one common coil configured to generate a magnetic field in both the first and second cores. The printed circuit board is configured to connect the plurality of hybrid core inductors in series.

14 Claims, 3 Drawing Sheets

(56) References Cited

U.S. PATENT DOCUMENTS

| | | | |
|---|---|---|---|
| 7,068,005 B2 * | 6/2006 | Baker | H02M 1/126 318/611 |
| 7,994,876 B2 | 8/2011 | Feng et al. | |
| 8,115,444 B2 | 2/2012 | De et al. | |
| 2003/0078005 A1 | 4/2003 | Recht | |
| 2006/0038650 A1 * | 2/2006 | Mehrotra | H01F 27/2804 336/83 |
| 2008/0037298 A1 | 2/2008 | LaFontaine | |
| 2008/0238599 A1 * | 10/2008 | Hebert | H01L 23/645 336/110 |
| 2010/0084750 A1 * | 4/2010 | Lotfi | H01F 17/0006 257/676 |
| 2012/0084750 A1 * | 4/2012 | Hardy | G06F 8/24 717/115 |
| 2012/0139664 A1 * | 6/2012 | Kim | H03H 9/542 333/189 |
| 2013/0127580 A1 * | 5/2013 | Dobbs | H01F 30/06 336/84 M |
| 2014/0285286 A1 * | 9/2014 | Bojer | H03H 7/0153 333/174 |
| 2014/0320255 A1 * | 10/2014 | Liu | H01F 27/24 336/221 |

FOREIGN PATENT DOCUMENTS

| | | | | |
|---|---|---|---|---|
| EP | 2720367 A2 | | 4/2014 | |
| GB | EP 2453450 A1 * | | 5/2012 | H01F 3/10 |
| JP | 2000228319 A | | 8/2000 | |

OTHER PUBLICATIONS

Extended European Search Report dated Dec. 8, 2015, for corresponding European Application No. 15157113.0.

\* cited by examiner

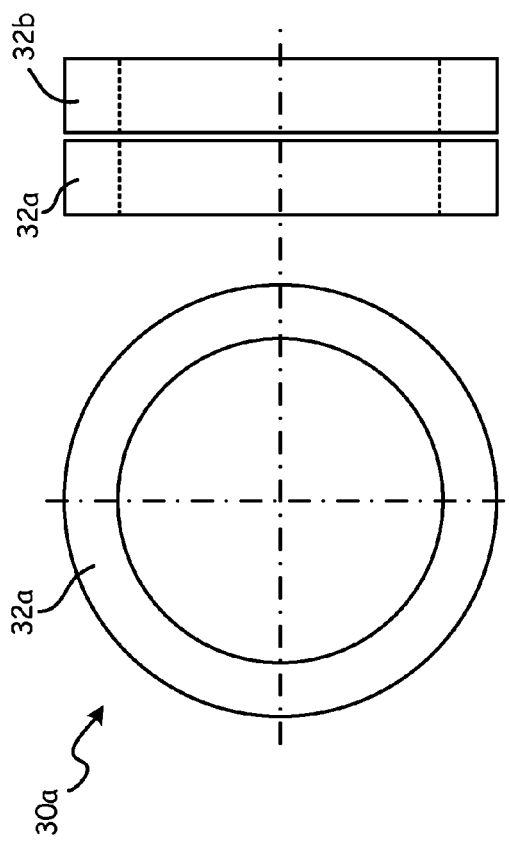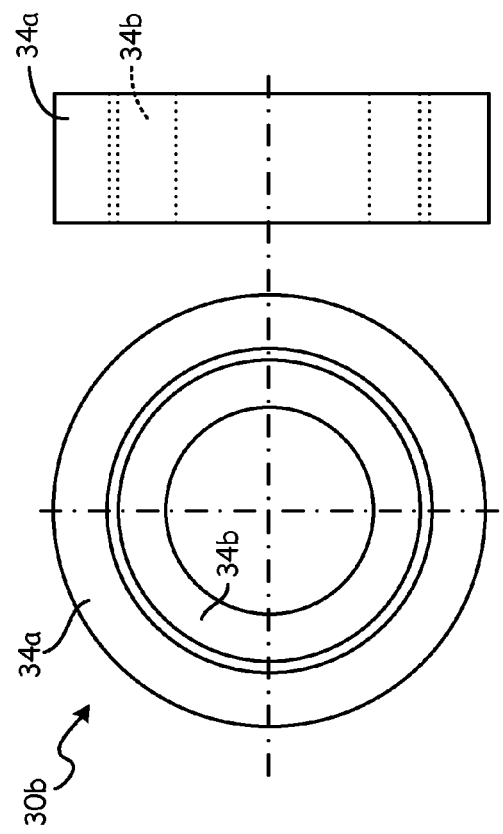

HYBRID PLANAR COMMON-MODE CHOKE

STATEMENT OF GOVERNMENT INTEREST

This invention was made with government support under N65540-08-D-0017 DO 0001 awarded by the Naval Sea Systems Command (NAVSEA). The government has certain rights in the invention.

BACKGROUND

The present invention relates generally to three-phase active rectifiers, and in particular to a hybrid planar common-mode choke utilized in conjunction with active rectifiers.

A switching-mode power conversion system that includes an active rectifier and a motor drive inverter generates high frequency (HF) voltage components that cause HF leakage currents and conducted electromagnetic interference (EMI), or "noise." This noise flows within power-feeding paths, and between the power conversion system and ground. The resulting HF currents are classified in common-mode (CM) and differential-mode (DM) components according to their circulation paths. Modern power conversion systems must meet strict EMI requirements, so filtering of electromagnetic noise is a significant concern.

Three-phase active rectifiers are utilized to meet strict input current harmonics requirements during power conversion of a three-phase alternating current (AC) input into a direct current (DC) output. Leakage current generated by a CM voltage of the active rectifier is the primary concern related to conducted and radiated EMI. Due to the HF leakage current conducted from the active rectifier through the earth ground, the CM current circulation loop is relatively large compared to that of the DM current. The large circulation loop acts as an antenna for the radiated EMI. A filter is often employed to handle this generated CM electromagnetic noise. Prior art filters have been designed utilizing, for example, chokes that are implemented in a stacked configuration that include several toroidal cores stacked upon one another to achieve a desired CM inductance. This configuration, however, is difficult to accommodate in power converters that are subject to significant shock and vibrations. It is desirable to eliminate/reduce stacking of CM choke inductor cores to eliminate/reduce stresses created in high shock and vibration environments.

SUMMARY

A common-mode choke includes a plurality of hybrid core inductors and a printed circuit board. Each of the plurality of hybrid core inductors includes a first core made of a first material, a second core made of a second material, and at least one common coil configured to generate a magnetic field in both the first and second cores. The printed circuit board is configured to connect the plurality of hybrid core inductors in series.

BRIEF DESCRIPTION OF THE DRAWINGS

FIGS. 2A and 2B are schematic diagrams illustrating hybrid toroidal cores utilized within planar common-mode chokes.

DETAILED DESCRIPTION

A planar common-mode (CM) choke is disclosed herein that includes multiple hybrid toroidal cores configured in a planar arrangement. Each hybrid toroidal core includes a ferrite toroidal core and a nanocrystalline toroidal core that are both magnetized by common windings. The hybrid cores are connected to one another in series through a printed circuit board (PCB) and are configured in a planar configuration between the PCB and a baseplate. This configuration reduces (in a parallel configuration shown in FIG. 2A) or eliminates (in a coaxial configuration shown in FIG. 2B) the need to stack toroidal cores on top of one another to achieve a desired CM inductance.

Figure 1:
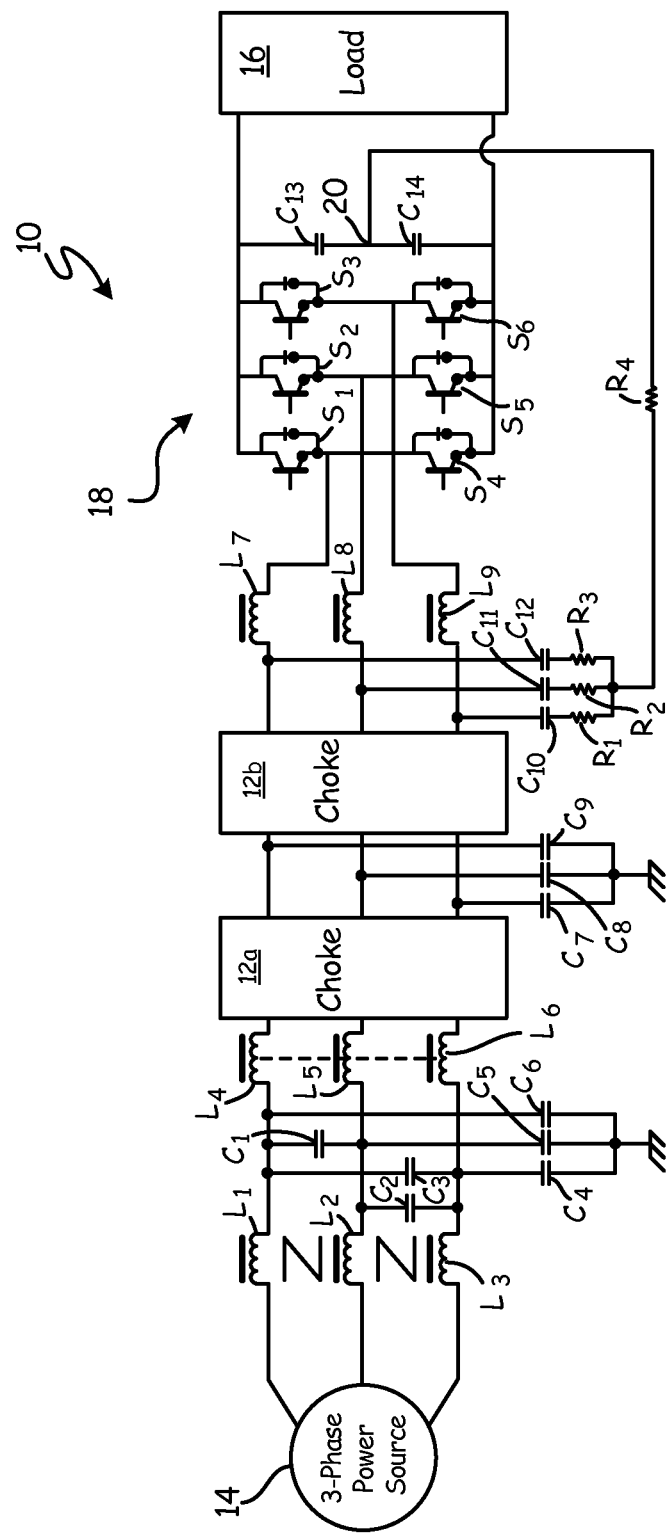
FIG. 1 is a circuit diagram illustrating a power conversion system that includes planar common-mode chokes.

FIG. 1 is a circuit diagram illustrating power conversion system 10 that includes planar CM chokes 12a and 12b. System 10 also includes three-phase power source 14, load 16, active rectifier 18, inductors L1-L9, capacitors C1-C14, and resistors R1-R4. Active rectifier 18 includes switches S1-S6, direct current (DC) midpoint 20, and may include a bulk DC bus capacitor (not shown) connected between the positive and negative DC rails. Active rectifier 18 may be utilized to convert alternating current (AC) power from three-phase power source 14 into DC output power for provision to load 16. Switches S1-S6 are selectively turned on and off by, for example, a controller (not shown) to condition the power provided on the DC output. Load 16 is any load that receives DC output power from active rectifier 18 such as, for example, a pulse-width modulated (PWM) inverter to drive a motor/starter in electric engine start applications. Operation of power system 10, particularly operation of active rectifier 18, may cause, for example, high frequency leakage currents and conducted electromagnetic interference (EMI).

Various filters may be implemented to counteract the effects of the conducted CM and differential-mode (DM) EMI. For example, as illustrated in FIG. 1, inductors L1-L3 may be implemented as a high frequency feed-through (bead) CM inductor, and capacitors C4-C9 may be connected between phase lines and ground to filter CM EMI. Capacitors C1-C3 may be connected between phase lines to filter out DM EMI. Capacitors C10-C12 may be connected in series with damping resistors R1-R4 to obtain a desirable damping DM filter that also includes active rectifier boost inductors L7-L9 and input filter inductors L4-L6. The neutral point of this DM filter is connected to DC bus midpoint 20 to divert the CM current from the DC bus. This filter architecture enables a low impedance CM current circulation loop, suppressing high frequency noise caused by a higher impedance grounding circuit loop.

CM chokes 12a and 12b may be implemented to filter the CM EMI. In past systems, chokes 12a and 12b were implemented as two dissimilar devices. For example, a first CM choke was implemented utilizing only ferrite core inductors to filter high frequency CM EMI and a second CM choke was implemented utilizing only nanocrystalline core inductors to filter low frequency CM EMI. Each prior art CM choke may have included vertically stacked cores in order to obtain a desired CM inductance for filtering the CM EMI. This configuration, however, is not desirable in power converters that are subjected to significant shock and vibration. This configuration also requires the use of two dissimilar CM chokes for sufficient filtering of the CM EMI which increases the complexity of the system.

With continued reference to FIG. 1, FIGS. 2A and 2B are schematic diagrams illustrating hybrid toroidal cores 30a and 30b for use in planar CM chokes 12a and 12b. FIG. 2A illustrates hybrid core 30a comprising a first core 32a and a second core 32b implemented in a parallel configuration. FIG. 2B illustrates hybrid core 30b comprising a first core 34a and a second core 34b implemented in a coaxial configuration. As illustrated in FIGS. 2A and 2B, cores 32a, 32b, 34a, and 34b may be implemented as toroidal cores. Toroidal cores offer a high effective permeance because they comprise a single continuous piece with no air gap.

As illustrated in FIG. 2A, a parallel configuration of hybrid core 30a includes cores 32a and 32b implemented with substantially similar inner diameters and substantially similar outer diameters. Cores 32a and 32b are positioned adjacent to one another such that hybrid core 30a also shares a substantially similar inner diameter and outer diameter. As illustrated in FIG. 2B, a coaxial configuration of hybrid core 30b includes core 34b having an outer diameter such that it is positionable within the inner diameter of core 34a. Therefore, hybrid core 30b has an inner diameter equal to the inner diameter of core 34b, and an outer diameter equal to the outer diameter of core 34a.

Figure 3:
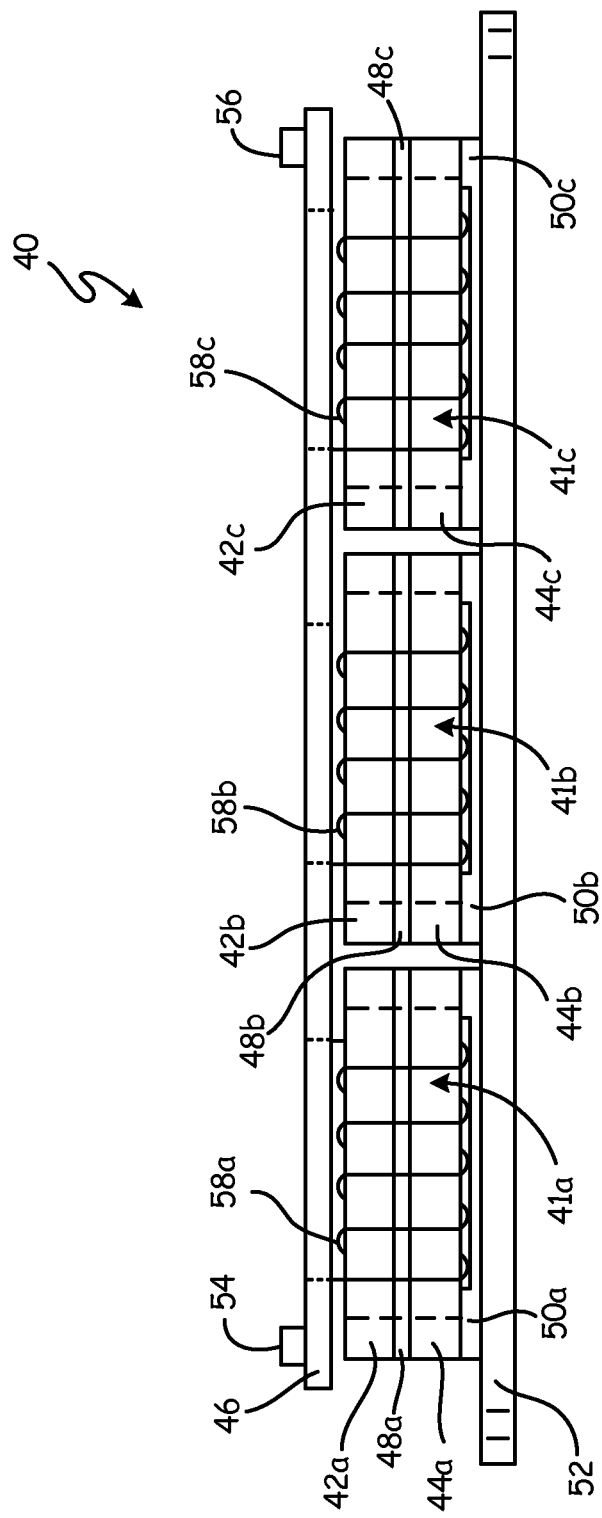
FIG. 3 is a schematic diagram illustrating a planar common-mode choke that includes hybrid toroidal cores.

Common three-phase windings (shown in FIG. 3) may be wound in the same direction and each generate a magnetic field in respective hybrid core 30a or 30b. The net magnetic field is the resultant scalar sum of magnetic fields produced by each phase winding of common three-phase windings. The CM current in the three-phase windings is the unbalanced current between the phases. This unbalanced current generates a magnetic field in respective core 30a or 30b. The CM inductance creates a high impedance which in turn filters the CM current.

Each first core 32a and 34a may be, for example, implemented as a ferrite core and each second core 32b and 34b may be, for example, implemented as a nanocrystalline core, or vice versa. Due to their respective magnetic properties, ferrite cores may be utilized, for example, to filter higher-frequency CM noise while nanocrystalline cores may be utilized to filter lower-frequency CM noise. While described as ferrite and nanocrystalline cores, any materials with magnetic properties suitable for filtering high and low frequency CM noise may be utilized for hybrid cores 30a and 30b.

With continued reference to FIGS. 1, 2A, and 2B, FIG. 3 is a schematic diagram illustrating planar CM choke 40 that includes three CM inductors. Each inductor contains a respective hybrid core 41a-41c and respective common three-phase windings (coils) 58a-58c. Planar CM choke 40 includes hybrid cores 41a-41c, printed circuit board (PCB) 46, insulation materials 48a-48c and 50a-50c, baseplate 52, and terminal blocks 54 and 56. Hybrid cores 41a-41c include first cores 42a-42c and second cores 44a-44c. While illustrated with three hybrid cores 41a-41c, other embodiments may include any number of hybrid cores to achieve a desired inductance. Coils 58a-58c are utilized to magnetize both cores 42a-42c and 44a-44c of each hybrid core 41a-41c. While illustrated in a parallel configuration, hybrid cores 41a-41c may also be implemented in a coaxial configuration as illustrated in FIG. 2B. With a coaxial configuration, cores 44a-44c would be positioned within the inner diameter of cores 42a-42c. Insulation material 48a-48c may be implemented between the outer diameter of cores 44a-44c and the inner diameter of cores 42a-42c. Coils 58a-58c would be wound around the outer diameter of cores 42a-42c and the inner diameter of cores 44a-44c to generate a magnetic field within both cores 42a-42c and 44a-44c of hybrid cores 41a-41c.

The three phase inputs for planar CM choke 40 may be connected to planar choke 40 through terminal block 54 and the three phase outputs may be provided from planar choke 40 through terminal block 56. In this way, multiple planar chokes 40 may be implemented in series. For example, both planar CM chokes 12a and 12b (FIG. 1) may be implemented using a single planar choke 40, or for greater total CM inductance, multiple similar planar chokes 40 may be implemented in series. In this way, the complexity of system 10 over the prior art may be reduced in that CM chokes 12a and 12b are no longer implemented as dissimilar parts. Capacitors C7-C9 may be mounted, for example, on PCB 46 along with any other components such as capacitors C1-C6 or damping resistors (not shown) that are desirable for use within system 10.

Insulation materials 50a-50c are positioned between baseplate 52 and hybrid cores 41a-41c. Thermally conductive insulation materials 50a-50c may provide a thermal path to baseplate 52. Insulation materials 50a-50c may contact both coils 58a-58c as well as cores 42a-42c. If implemented in a coaxial configuration, insulation materials 50a-50c may contact both cores of each hybrid core 41a-41c. In another embodiment, baseplate 52 may be replaced by an air-cooled or liquid-cooled heat sink. In another embodiment, a thermally conductive potting material may be utilized to encapsulate hybrid cores 41a-41c to provide an improved thermal path to baseplate 52. Insulation material 48a-48c may be made of any material that provides good thermal conductivity and sufficient insulation between the cores of hybrid core inductors 41a-41c and baseplate 52.

It may be desirable to tailor the CM inductance of planar CM choke 40 for specific applications. The CM inductance of planar CM choke 40 may be calculated as follows:

$$L_{CM} = 3 \cdot L_T \cdot N^2 \quad (1)$$

where:

$L_T$—inductance per turn of the hybrid toroidal core (single section), and

N—number of turns in the winding per section

It may also be desirable to tailor the properties of planar CM choke 40 to minimize leakage inductance that is approximately independent of currents and frequency. DM inductance and DM current is a primary cause of saturation of hybrid cores 41a-41c. The leakage inductance is directly related to the cross-sectional area of hybrid cores 41a-41c. It therefore may be desirable to select a cross-sectional area of hybrid cores 41a-41c that maximizes the inductance per turn of hybrid toroidal cores 41a-41c while minimizing the leakage inductance. In this way, the CM inductance may be maximized while minimizing the leakage inductance.

The use of planar CM chokes 40 to filter CM EMI generated by, for example, active rectifier 18 is advantageous over the prior art in that, among other things, it eliminates stacking of cores and provides cooling for hybrid core inductors 41a-41c. The planar configuration of CM choke 40 greatly reduces the stresses caused by shock and vibration in intense environments. The use of planar CM chokes 40 also allows for the use of a single device to filter both high-frequency and low-frequency CM EMI, which reduces the complexity of power system 10 over prior art systems.

Discussion of Possible Embodiments

The following are non-exclusive descriptions of possible embodiments of the present invention.

A common-mode choke includes a plurality of hybrid core inductors and a printed circuit board. Each of the plurality of hybrid core inductors includes a first core made of a first material, a second core made of a second material, and at least one common coil configured to generate a magnetic field in both the first and second cores. The printed circuit board is configured to connect the plurality of hybrid core inductors in series.

The common-mode choke of the preceding paragraph can optionally include, additionally and/or alternatively, any one or more of the following features, configurations and/or additional components:

A further embodiment of the foregoing common-mode choke, further including a base plate and an insulating material. The plurality of hybrid core inductors are positioned between the printed circuit board and the base plate. The insulating material is connected between the plurality of hybrid core inductors and the baseplate.

A further embodiment of any of the foregoing common-mode chokes, wherein the insulating material is in thermal contact with both the second core and the at least one coil.

A further embodiment of any of the foregoing common-mode chokes, wherein the first core and the second core are configured in a parallel configuration.

A further embodiment of any of the foregoing common-mode chokes, wherein the first core and the second core are configured in a coaxial configuration.

A further embodiment of any of the foregoing common-mode chokes, wherein the at least one coil includes a first coil connected to receive a first power phase input, a second coil connected to receive a second power phase input, and a third coil connected to receive a third power phase input.

A further embodiment of any of the foregoing common-mode chokes, wherein the first material is ferrite and the second material is nanocrystalline.

A further embodiment of any of the foregoing common-mode chokes, wherein the plurality of hybrid core inductors comprises three hybrid core inductors.

A power conversion system includes a three-phase input power source, an active rectifier, and at least one planar common-mode choke. The active rectifier converts alternating current from the three-phase power source into direct current power for a load. The at least one planar common-mode choke is connected to filter common-mode electromagnetic interference generated by the active rectifier. The least one planar common-mode choke includes a plurality of hybrid core inductors and a printed circuit board. The plurality of hybrid core inductors each include a first core and a second core. The first core and the second core share at least one coil connected to the three-phase power source. The printed circuit board is configured to connect the plurality of hybrid core inductors in series and the plurality of hybrid core inductors are connected to the printed circuit board in a planar configuration.

The power conversion system of the preceding paragraph can optionally include, additionally and/or alternatively, any one or more of the following features, configurations and/or additional components:

A further embodiment of the foregoing power conversion system, wherein the at least one planar common-mode choke further includes a base plate and an insulating material. The plurality of hybrid core inductors are positioned between the printed circuit board and the base plate. The insulating material is connected between the plurality of hybrid core inductors and the baseplate.

A further embodiment of any of the foregoing power conversion systems, wherein the insulating material is in thermal contact with one of the first core and the second core of each of the plurality of hybrid core inductors, and wherein the insulating material is in further thermal contact with the at least one coil of each of the plurality of hybrid core inductors.

A further embodiment of any of the foregoing power conversion systems, wherein the first core and the second core of each of the plurality of hybrid core inductors are configured in a parallel configuration.

A further embodiment of any of the foregoing power conversion systems, wherein the first core and the second core of each of the plurality of hybrid core inductors are configured in a coaxial configuration.

A further embodiment of any of the foregoing power conversion systems, wherein the at least one coil includes a first coil connected to receive a first power phase input from the three-phase input power source, a second coil connected to receive a second power phase input from the three-phase input power source, and a third coil connected to receive a third power phase input from the three-phase input power source.

A further embodiment of any of the foregoing power conversion systems, wherein the first core of each of the plurality of hybrid core inductors is a ferrite core and the second core of each of the plurality of hybrid core inductors is a nanocrystalline core.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A common-mode choke comprising:
   a plurality of hybrid core inductors, wherein each of the plurality of hybrid core inductors comprises:
      a first core comprising a first material;
      a second core comprising a second material, wherein the first core and the second core are configured in a coaxial configuration; and
      at least one common coil configured to generate a magnetic field in both the first and second cores; and
   a printed circuit board configured to connect the plurality of hybrid core inductors in series, wherein the plurality of hybrid core inductors are connected to the printed circuit board in a planar configuration.

2. The common-mode choke of claim 1, further comprising:
   a base plate, wherein the plurality of hybrid core inductors are positioned between the printed circuit board and the base plate; and
   an insulating material connected between the plurality of hybrid core inductors and the baseplate.

3. The common-mode choke of claim 2, wherein the insulating material is in thermal contact with both the second core and the at least one coil.

4. The common-mode choke of claim 1, wherein the at least one coil comprises:
   a first coil connected to receive a first power phase input;
   a second coil connected to receive a second power phase input; and
   a third coil connected to receive a third power phase input.

5. The common-mode choke of claim 1, wherein the first material is ferrite and the second material is nanocrystalline.

6. The common-mode choke of claim 1, wherein the plurality of hybrid core inductors comprises three hybrid core inductors.

7. A power conversion system comprising:
a three-phase input power source;
an active rectifier that converts alternating current from the three-phase power source into direct current power for a load;
at least one planar common-mode choke connected to filter common-mode electromagnetic interference generated by the active rectifier, wherein the at least one planar common-mode choke comprises:
  a plurality of hybrid core inductors that each comprise a first core and a second core, wherein the first core and the second core share at least one multiphase coil connected to the three-phase power source, and wherein the first core and the second core are configured in a coaxial configuration; and
  a printed circuit board configured to connect the plurality of hybrid core inductors in series, wherein the plurality of hybrid core inductors are connected to the printed circuit board in a planar configuration.

8. The power conversion system of claim 7, wherein the at least one planar common-mode choke further comprises:
  a base plate, wherein the plurality of hybrid core inductors are positioned between the printed circuit board and the base plate; and
  an insulating material connected between the plurality of hybrid core inductors and the baseplate.

9. The power conversion system of claim 8, wherein the insulating material is in thermal contact with one of the first core and the second core of each of the plurality of hybrid core inductors, and wherein the insulating material is in further thermal contact with the at least one multiphase coil of each of the plurality of hybrid core inductors.

10. The power conversion system of claim 7, wherein the at least one multiphase coil comprises:
  a first coil connected to receive a first power phase input from the three-phase input power source;
  a second coil connected to receive a second power phase input from the three-phase input power source; and
  a third coil connected to receive a third power phase input from the three-phase input power source.

11. The power conversion system of claim 7, wherein the first core of each of the plurality of hybrid core inductors is a ferrite core and the second core of each of the plurality of hybrid core inductors is a nanocrystalline core.

12. A power conversion system comprising:
a three-phase input power source;
an active rectifier that converts alternating current from the three-phase power source into direct current power for a load;
at least one planar common-mode choke connected to filter common-mode electromagnetic interference generated by the active rectifier, wherein the at least one planar common-mode choke comprises:
  a plurality of hybrid core inductors that each comprise a first core and a second core, wherein the first core and the second core share at least one multiphase coil connected to the three-phase power source;
  a printed circuit board configured to connect the plurality of hybrid core inductors in series, wherein the plurality of hybrid core inductors are connected to the printed circuit board in a planar configuration;
  a base plate, wherein the plurality of hybrid core inductors are positioned between the printed circuit board and the base plate; and
  an insulating material connected between the plurality of hybrid core inductors and the baseplate, wherein the insulating material is in thermal contact with one of the first core and the second core of each of the plurality of hybrid core inductors, and wherein the insulating material is in further thermal contact with the at least one multiphase coil of each of the plurality of hybrid core inductors.

13. The power conversion system of claim 12, wherein the at least one multiphase coil comprises:
  a first coil connected to receive a first power phase input from the three-phase input power source;
  a second coil connected to receive a second power phase input from the three-phase input power source; and
  a third coil connected to receive a third power phase input from the three-phase input power source.

14. The power conversion system of claim 12, wherein the first core of each of the plurality of hybrid core inductors is a ferrite core and the second core of each of the plurality of hybrid core inductors is a nanocrystalline core.

\* \* \* \* \*